United States Patent
Matsumura

(10) Patent No.: US 8,405,743 B2
(45) Date of Patent: Mar. 26, 2013

(54) IMAGE-DATA PROCESSING APPARATUS

(75) Inventor: Hideki Matsumura, Kyoto (JP)

(73) Assignee: SANYO Electric Co., Ltd., Moriguchi-Shi (JP)

( * ) Notice: Subject to any disclaimer, the term of this patent is extended or adjusted under 35 U.S.C. 154(b) by 347 days.

(21) Appl. No.: 12/906,040

(22) Filed: Oct. 15, 2010

(65) Prior Publication Data

US 2011/0090542 A1    Apr. 21, 2011

(30) Foreign Application Priority Data

Oct. 16, 2009    (JP) ................... 2009-238840

(51) Int. Cl.
*H04N 5/262* (2006.01)
*H04N 3/14* (2006.01)
*H04N 9/475* (2006.01)
*H04N 5/04* (2006.01)
*G06K 9/32* (2006.01)

(52) U.S. Cl. ............ 348/240.99; 348/240.2; 348/240.1; 348/320; 348/513; 348/550; 382/299; 396/60

(58) Field of Classification Search ............... 348/240.1, 348/240.99, 240.2, 240.3, 211.9, 229.1, 347, 348/320, 322, 231.2, 231.9, 446, 448, 500, 348/513, 515, 550, 558; 382/299; 396/60
See application file for complete search history.

(56) References Cited

U.S. PATENT DOCUMENTS

| 6,762,792 B1 * | 7/2004 | Matsumura ............... 348/240.2 |
| 7,142,236 B2 * | 11/2006 | Matsumura ............. 348/240.99 |
| 2002/0071039 A1 | 6/2002 | Hamasaki et al. |
| 2004/0095485 A1 * | 5/2004 | Ueda et al. ................ 348/240.1 |

FOREIGN PATENT DOCUMENTS

| JP | 04-119084 | 4/1992 |
| JP | 2002-135797 | 5/2002 |

* cited by examiner

*Primary Examiner* — Nhan T Tran
*Assistant Examiner* — Marly Camargo
(74) *Attorney, Agent, or Firm* — Novak Druce Connolly Bove + Quigg LLP

(57) ABSTRACT

An image-data processing apparatus includes a writer which writes image data into a memory according to a non-interlaced-scanning or an interlaced-scanning of each N line. An updater updates a cumulative zoom coefficient by accumulating, for each line, a decimal portion of the cumulative zoom coefficient to a first numerical value corresponding to the zoom coefficient. An accumulator accumulates, for each line, a second numerical value corresponding to an integer portion of the cumulative zoom coefficient. A reader reads out image data in a line corresponding to an accumulated value of the accumulator. A first setter sets N-times the zoom coefficient to the first numerical value in the non-interlaced-scanning, and sets the zoom coefficient to the first numerical value in the interlaced-scanning. A second setter sets an integer portion to the second numerical value in the non-interlaced-scanning, and sets N-times the integer portion to the second numerical value in the interlaced-scanning.

7 Claims, 12 Drawing Sheets

(A) RAW IMAGE DATA (60fps)

(B) WRITING-IMAGE DATA (PS MODE: 60fps)

(C) WRITING-IMAGE DATA (IS MODE: 30fps)

(D) READING-OUT-IMAGE DATA (30fps)

FIG.4

(A) PS MODE

| 1st LINE |
|---|
| 2nd LINE |
| 3rd LINE |
| 4th LINE |
| 5th LINE |
| ⋮ |
| 480th LINE |

(B) IS MODE

| 1st LINE |
|---|
| 3rd LINE |
| 5th LINE |
| ⋮ |
| 479th LINE |
| 2nd LINE |
| 4th LINE |
| ⋮ |
| 480th LINE |

FIG.7

(A) ODD-NUNBERED FIELD

| ZMx2 | -- | 200h | 200h | 200h | 200h | 200h | 200h | 200h | 200h | ... |
|---|---|---|---|---|---|---|---|---|---|---|
| AZMs | 0h | 200h | 200h | 200h | 200h | 200h | 200h | 200h | 200h | ... |
| AZMs_D | 0h | 0h | 0h | 0h | 0h | 0h | 0h | 0h | 0h | ... |
| AZMs_I | 0h | 2h | 2h | 2h | 2h | 2h | 2h | 2h | 2h | ... |
| RDs+ OFST | 1st LINE | 3th LINE | 5th LINE | 7th LINE | 9th LINE | 11th LINE | 13th LINE | 15th LINE | 17th LINE | ... |

(B) EVEN-NUMBERED FIELD

| ZMx2 | -- | 200h | 200h | 200h | 200h | 200h | 200h | 200h | 200h | ... |
|---|---|---|---|---|---|---|---|---|---|---|
| AZMs | 100h | 200h | 200h | 200h | 200h | 200h | 200h | 200h | 200h | ... |
| AZMs_D | 0h | 0h | 0h | 0h | 0h | 0h | 0h | 0h | 0h | ... |
| AZMs_I | 1h | 2h | 2h | 2h | 2h | 2h | 2h | 2h | 2h | ... |
| RDs+ OFST | 2nd LINE | 4th LINE | 6th LINE | 8th LINE | 10th LINE | 12th LINE | 14th LINE | 16th LINE | 18th LINE | ... |

FIG.8

(A) ODD-NUMBERED FIELD

| | | | | | | | | | |
|---|---|---|---|---|---|---|---|---|---|
| ZM | — | 100h | 100h | 100h | 100h | 100h | 100h | 100h | 100h | ... |
| AZMs | 0h | 100h | 100h | 100h | 100h | 100h | 100h | 100h | 100h | ... |
| AZMs_D | 0h | 0h | 0h | 0h | 0h | 0h | 0h | 0h | 0h | ... |
| AZMs_I | 0h | 1h | 1h | 1h | 1h | 1h | 1h | 1h | 1h | ... |
| AZMs_Ix2 | — | 2h | 2h | 2h | 2h | 2h | 2h | 2h | 2h | ... |
| RDs+ OFST | 1st LINE | 3rd LINE | 5th LINE | 7th LINE | 9th LINE | 11th LINE | 13th LINE | 15th LINE | 17th LINE | ... |

(B) EVEN-NUMBERED FIELD

| | | | | | | | | | |
|---|---|---|---|---|---|---|---|---|---|
| ZM | — | 100h | 100h | 100h | 100h | 100h | 100h | 100h | 100h | ... |
| AZMs | 100h | 100h | 100h | 100h | 100h | 100h | 100h | 100h | 100h | ... |
| AZMs_D | 0h | 0h | 0h | 0h | 0h | 0h | 0h | 0h | 0h | ... |
| AZMs_I | 1h | 1h | 1h | 1h | 1h | 1h | 1h | 1h | 1h | ... |
| AZMs_Ix2 | — | 2h | 2h | 2h | 2h | 2h | 2h | 2h | 2h | ... |
| RDs+ OFST | 2nd LINE | 4th LINE | 6th LINE | 8th LINE | 10th LINE | 12th LINE | 14th LINE | 16th LINE | 18th LINE | ... |

FIG.9

(A) ODD-NUMBERED FIELD

| | | | | | | | | | |
|---|---|---|---|---|---|---|---|---|---|
| ZMx2 | — | 280h | 280h | 280h | 280h | 280h | 280h | 280h | ... |
| AZMs | 0h | 280h | 300h | 280h | 300h | 280h | 300h | 280h | 300h | ... |
| AZMs_D | 0h | 80h | 0h | 80h | 0h | 80h | 0h | 80h | 0h | ... |
| AZMs_I | 0h | 2h | 3h | 2h | 3h | 2h | 3h | 2h | 3h | ... |
| RDs+ OFST | 1st LINE | 3rd LINE | 6th LINE | 8th LINE | 11th LINE | 13th LINE | 16th LINE | 18th LINE | 21th LINE | ... |

(B) EVEN-NUMBERED FIELD

| | | | | | | | | | |
|---|---|---|---|---|---|---|---|---|---|
| ZMx2 | — | 280h | 280h | 280h | 280h | 280h | 280h | 280h | ... |
| AZMs | 140h | 2C0h | 340h | 2C0h | 340h | 2C0h | 340h | 2C0h | 340h | ... |
| AZMs_D | 40h | C0h | 40h | C0h | 40h | C0h | 40h | C0h | 40h | ... |
| AZMs_I | 1h | 2h | 3h | 2h | 3h | 2h | 3h | 2h | 3h | ... |
| RDs+ OFST | 2nd LINE | 4th LINE | 7th LINE | 9th LINE | 12th LINE | 14th LINE | 17th LINE | 19th LINE | 22th LINE | ... |

FIG.10

(A) ODD-NUMBERED FIELD

| | | | | | | | | | |
|---|---|---|---|---|---|---|---|---|---|
| ZM | -- | 140h | 140h | 140h | 140h | 140h | 140h | 140h | 140h | ... |
| AZMs | 0h | 140h | 180h | 1C0h | 200h | 140h | 180h | 1C0h | 200h | ... |
| AZMs_D | 0h | 40h | 80h | C0h | 0h | 40h | 80h | C0h | 0h | ... |
| AZMs_I | 0h | 1h | 1h | 1h | 2h | 1h | 1h | 1h | 2h | ... |
| AZMs_Ix2 | -- | 2h | 2h | 2h | 4h | 2h | 2h | 2h | 4h | ... |
| RDs+ OFST | 1st LINE | 3rd LINE | 5th LINE | 7th LINE | 11th LINE | 13th LINE | 15th LINE | 17th LINE | 21st LINE | ... |

(B) EVEN-NUMBERED FIELD

| | | | | | | | | | |
|---|---|---|---|---|---|---|---|---|---|
| ZM | -- | 140h | 140h | 140h | 140h | 140h | 140h | 140h | 140h | ... |
| AZMs | 140h | 180h | 1C0h | 200h | 140h | 180h | 1C0h | 200h | 140h | ... |
| AZMs_D | 40h | 80h | C0h | 0h | 40h | 80h | C0h | 0h | 40h | ... |
| AZMs_I | 1h | 1h | 1h | 2h | 1h | 1h | 1h | 2h | 1h | ... |
| AZMs_Ix2 | -- | 2h | 2h | 4h | 2h | 2h | 2h | 4h | 2h | ... |
| RDs+ OFST | 2nd LINE | 4th LINE | 6th LINE | 10th LINE | 12th LINE | 14th LINE | 16th LINE | 20th LINE | 22nd LINE | ... |

US 8,405,743 B2

IMAGE-DATA PROCESSING APPARATUS

CROSS REFERENCE OF RELATED APPLICATION

The disclosure of Japanese Patent Application No. 2009-238840, which was filed on Oct. 16, 2009, is incorporated herein by reference.

BACKGROUND OF THE INVENTION

1. Field of the Invention

The present invention relates to an image-data processing apparatus. More particularly, the present invention relates to an image-data processing apparatus which is applied to a digital camera and which reproduces an object scene image with a desired zoom magnification.

2. Description of the Related Art

According to one example of this type of apparatus, a pixel signal produced by a CCD is read out in a progressive scanning manner, and image data based on the read-out pixel signal is subjected to a zoom process by an H zoom circuit. The image data on which the zoom process has been performed undergoes a sampling-frequency converter, and is written into a memory in the progressive scanning manner. Thereafter, the image data accommodated in the memory is read out in the progressive scanning manner or an interlace scanning manner, and is outputted from a moving-image output terminal.

However, in the above-described apparatus, a scanning manner at the time of writing into the memory is not changed between the progressive scanning manner and the interlace scanning manner, and the image data read out from the memory is not subjected to the zoom process, either. Thus, in a case where the zoom process is performed on the image data accommodated in the memory in respectively different scanning manners, the quality of the image data may be deteriorated in the above-described apparatus.

SUMMARY OF THE INVENTION

An image-data processing apparatus according to the present invention comprises: a writer which writes image data into a memory in a manner according to one of a non-interlaced scanning and an interlaced scanning of each N line (N: an integer of two or more); an updater which updates a cumulative zoom coefficient by accumulating, for each line, a decimal portion of the cumulative zoom coefficient to a first numerical value corresponding to the zoom coefficient; an accumulator which accumulates, for each line, a second numerical value corresponding to an integer portion of the cumulative zoom coefficient; a reader which reads out data in a line corresponding to an accumulated value of the accumulator, out of the image data accommodated in the memory by the writer; a first setter which sets N times of the zoom coefficient to the first numerical value, corresponding to the non-interlaced scanning, and which sets the zoom coefficient to the first numerical value, corresponding to the interlaced scanning; and a second setter which sets the integer portion to the second numerical value, corresponding to the non-interlaced scanning, and sets N times of the integer portion to the second numerical value, corresponding to the interlaced scanning.

The above described features and advantages of the present invention will become more apparent from the following detailed description of the embodiment when taken in conjunction with the accompanying drawings.

BRIEF DESCRIPTION OF THE DRAWINGS

FIG. 4(A) is an illustrative view showing one example of a placement of image data in the PS mode;

FIG. 4(B) is an illustrative view showing one example of a placement of image data in the IS mode;

FIG. 7(A) is an illustrative view showing one example of reading-out control behavior in an odd-numbered field when the PS mode is selected;

FIG. 7(B) is an illustrative view showing one example of the reading-out control behavior in an even-numbered field when the PS mode is selected;

FIG. 8(A) is an illustrative view showing one example of the reading-out control behavior in an odd-numbered field when the IS mode is selected;

FIG. 8(B) is an illustrative view showing one example of the reading-out control behavior in an even-numbered field when the IS mode is selected;

FIG. 9(A) is an illustrative view showing another example of the reading-out control behavior in the odd-numbered field when the PS mode is selected;

FIG. 9(B) is an illustrative view showing another example of the reading-out control behavior in the even-numbered field when the PS mode is selected;

FIG. 10(A) is an illustrative view showing another example of the reading-out control behavior in the odd-numbered field when the IS mode is selected;

FIG. 10(B) is an illustrative view showing another example of the reading-out control behavior in the even-numbered field when the IS mode is selected;

DETAILED DESCRIPTION OF THE PREFERRED EMBODIMENTS

Figure 1:
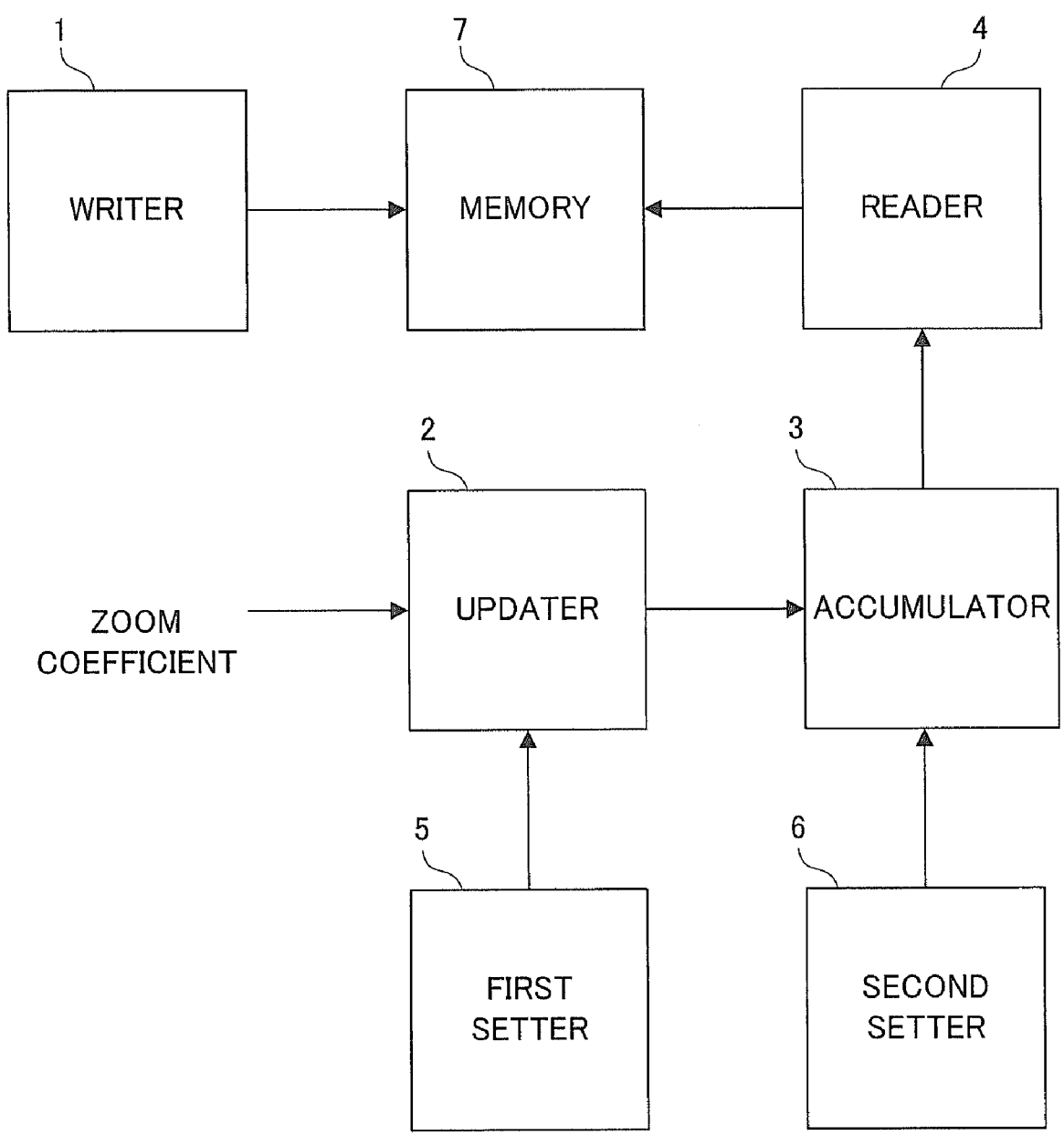
FIG. 1 is a block diagram showing a basic configuration of one embodiment of the present invention.

With reference to FIG. 1, an image-data processing apparatus of one embodiment of the present invention is basically configured as follows: A writer 1 writes image data into a memory 7 in a manner according to one of a non-interlaced scanning and an interlaced scanning of each N line (N: an integer of two or more). An updater 2 updates a cumulative zoom coefficient by accumulating, for each line, a decimal portion of the cumulative zoom coefficient to a first numerical value corresponding to the zoom coefficient; An accumulator 3 accumulates, for each line, a second numerical value corresponding to an integer portion of the cumulative zoom coefficient. A reader 4 reads out data in a line corresponding to an accumulated value of the accumulator 3, out of the image data accommodated by the writer 1 into the memory 7. A first setter 5 sets N limes of the zoom coefficient to the first numerical value, corresponding to the non-interlaced scanning, and sets the zoom coefficient to the first numerical value, corresponding to the interlaced scanning. A second setter 6 sets the integer portion to the second numerical value, corresponding to the non-interlaced scanning, and sets N times of the integer portion to the second numerical value, corresponding to the interlaced scanning.

An arithmetic operation of "N times" is executed both in the non-interlaced scanning and the interlaced scanning, and it is therefore possible to share an expansion of the zoomed image between the scanning manners. Moreover, setting N times of the integer portion of the cumulative zoom coefficient to the second numerical value, corresponding to the interlaced scanning, enables avoiding a situation in which the image data read out from the memory 7 strides over a plurality of fields. Furthermore, setting N times of the zoom coefficient to the first numerical value, corresponding to the non-interlaced scanning, enables securing an accuracy of the cumulative zoom coefficient. Thus, a quality of the image data on which the zoom process is performed is improved.

Figure 2:
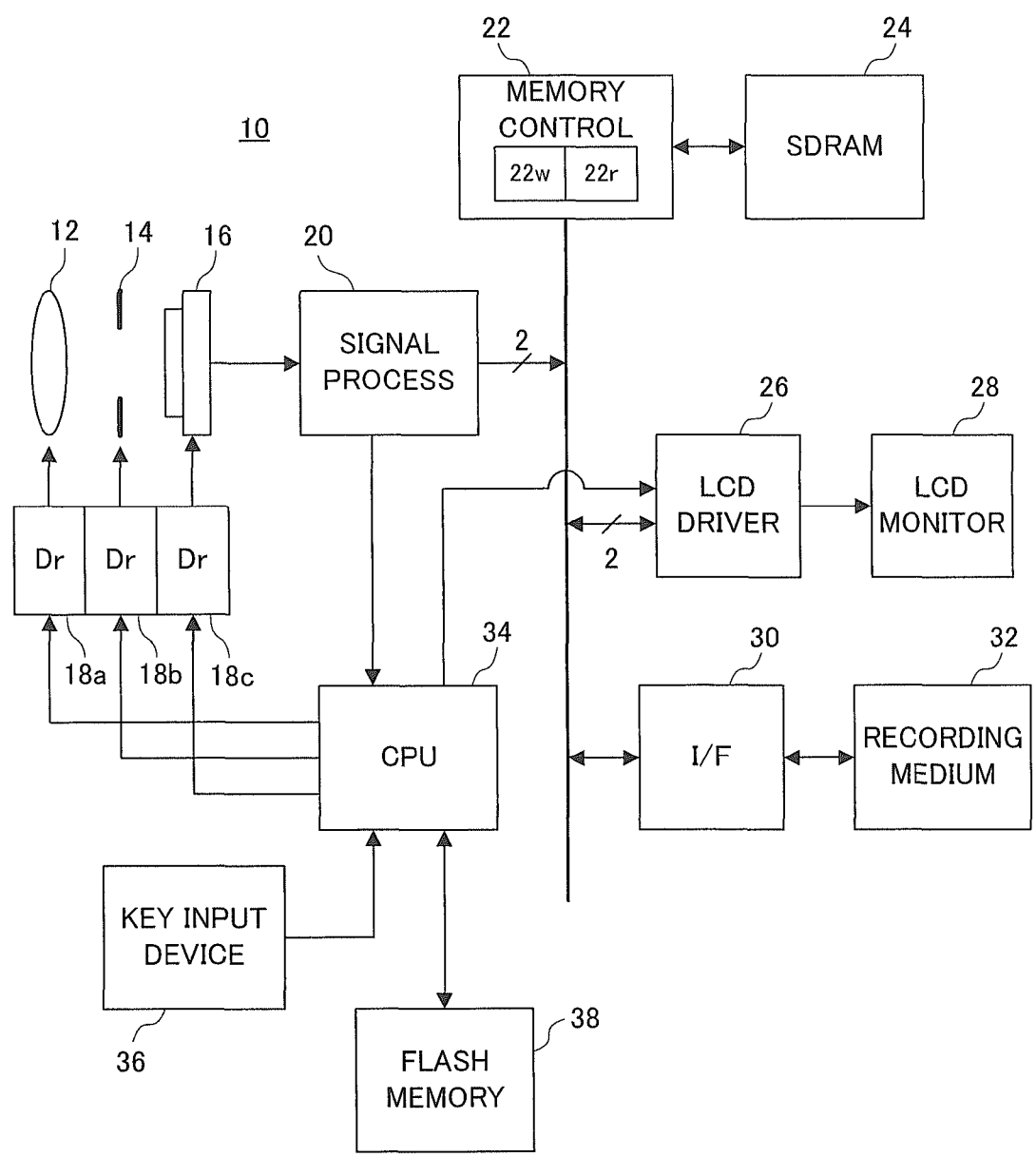
FIG. 2 is a block diagram showing a configuration of one embodiment of the present invention.

With reference to FIG. 2, a digital camera 10 according to this embodiment includes a focus lens 12 and an aperture unit 14 respectively driven by drivers 18a and 18b. An optical image of an object scene that undergoes these components enters, with irradiation, an imaging surface of an imager 16, and is subjected to a photoelectric conversion.

When a power source is applied, a CPU 34 commands a driver 18c to repeat exposure behavior and electric-charge reading-out behavior in order to execute a moving-image fetching process. At each generation of a vertical synchronization signal Vsync1 for an imaging system, the driver 18c exposes the imaging surface of the imager 16 and reads out electric charges produced on the imaging surface in a non-interlaced scanning manner. From the imager 16, raw image data based on the read-out electric charges is cyclically outputted.

A signal processing circuit 20 performs processes, such as white balance adjustment, color separation, and YUV conversion, on the raw image data outputted from the imager 16, and applies YUV formatted-image data produced through these processes, together with a writing request, to a memory control circuit 22. The image data is written into an SDRAM 24 by a data writing circuit 22w.

An LCD driver 26 issues a reading-out request at each generation of a vertical synchronization signal Vsync2 for a display system toward the memory control circuit 22 in order to read out the image data accommodated in the SDRAM 24. The image data accommodated in the SDRAM 24 is repeatedly read out by a data reading-out circuit 22r, and is applied to the LCD driver 26. Based on the applied image data, the LCD driver 26 drives an LCD monitor 28, and as a result, a moving image representing the object scene is displayed on a monitor screen.

Out of the image data produced by the signal processing circuit 20, Y data is applied also to the CPU 34. The CPU 34 performs an AE process on the applied Y data so as to calculate an appropriate EV value. An aperture amount and an exposure time defining the calculated appropriate EV value are set to the drivers 18b and 18c, respectively, and as a result, the brightness of the moving image is moderately adjusted.

Moreover, the CPU 34 performs an AF process on a high-frequency component of the Y data applied from the signal processing circuit 20. Thereby, the focus lens 12 is placed at a focal point, and thus, the sharpness of the moving image is improved.

When a recording start manipulation is executed, the CPU 34 commands an I/F 30 to start a recording process. The I/F 30 repeatedly issues a reading-out request toward the memory control circuit 22 in order to read out the image data accommodated in the SDRAM 24. The image data accommodated in the SDRAM 24 is repeatedly read out by the data reading-out circuit 22r, and is recorded on a recording medium 32 by the I/F 30. When a recording end manipulation is executed, the CPU 34 commands the I/F 30 to end the recording process. The I/F 30 ends the issuance of the reading-out request, and executes a predetermined ending process on the recording medium 32.

The vertical synchronization signal Vsync1 for the imaging system is generated at each 1/60th of a second. Thus, the raw image data having the non-interlaced scanning manner is outputted from the imager 16 at a frame rate of 60 fps (fps: frame per second), as shown in FIG. 3(A).

To the signal processing circuit 20, one of a PS mode and an IS mode is set as a writing mode, in response to a mode switching manipulation on a key input device 36. The signal processing circuit 20 outputs the image data having the non-interlaced scanning manner at a frame rate of 60 fps when the PS mode is set, and outputs the image data having the interlaced scanning manner at a frame rate of 30 fps when the IS mode is set.

Figure 3:
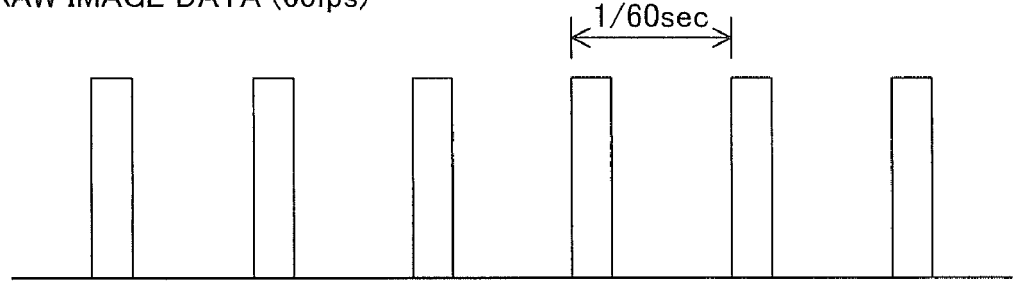
FIG. 3(A) is a timing chart showing one example of output behavior of raw image data.
FIG. 3(B) is a timing chart showing one example of writing behavior of image data in a PS mode.
FIG. 3(C) is a timing chart showing one example of writing behavior of image data in an IS mode.
FIG. 3(D) is a timing chart showing one example of reading-out behavior of image data.
Figure 3:
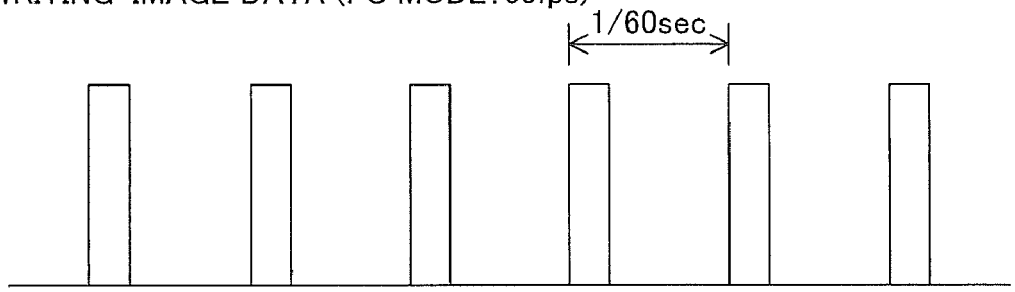
Figure 3:
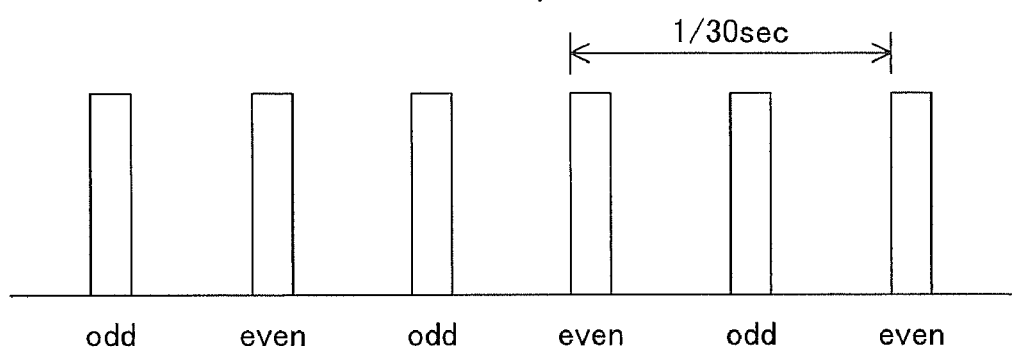
Figure 3:
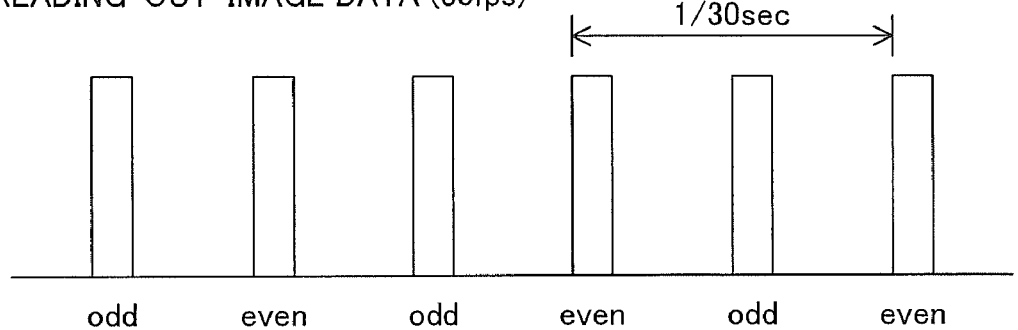

The image data in each frame is outputted in an integrated manner as shown in FIG. 3(B) when the PS mode is set, and is outputted while being divided in an odd-numbered field and an even-numbered field as shown in FIG. 3(C) when the IS mode is set.

Both in the PS mode and the IS mode, the image data has 480 lines. Corresponding to the PS mode, the image data is written into the SDRAM 24 as shown in FIG. 4(A) while corresponding to the IS mode, the image data is written into the SDRAM 24 as shown in FIG. 4(B). According to FIG. 4(A), the odd-numbered lines and the even-numbered lines are alternately disposed so that the line numbers are arranged successively. According to FIG. 4(B), 240 odd-numbered lines are disposed in a first half and 240 even-numbered lines are disposed in a second half so that the line numbers are arranged every other line (intermittently).

The vertical synchronization signal Vsync2 for the display system is also generated at each 1/60th of a second. The LCD driver 26 reads out the image data disposed as shown in FIG. 4(A) or FIG. 4(B) by dividing it into the odd-numbered field and the even-numbered field as shown in FIG. 3(D). The read-out image data is applied to the LCD driver 26 at a frame rate of 30 fps.

Figure 5:
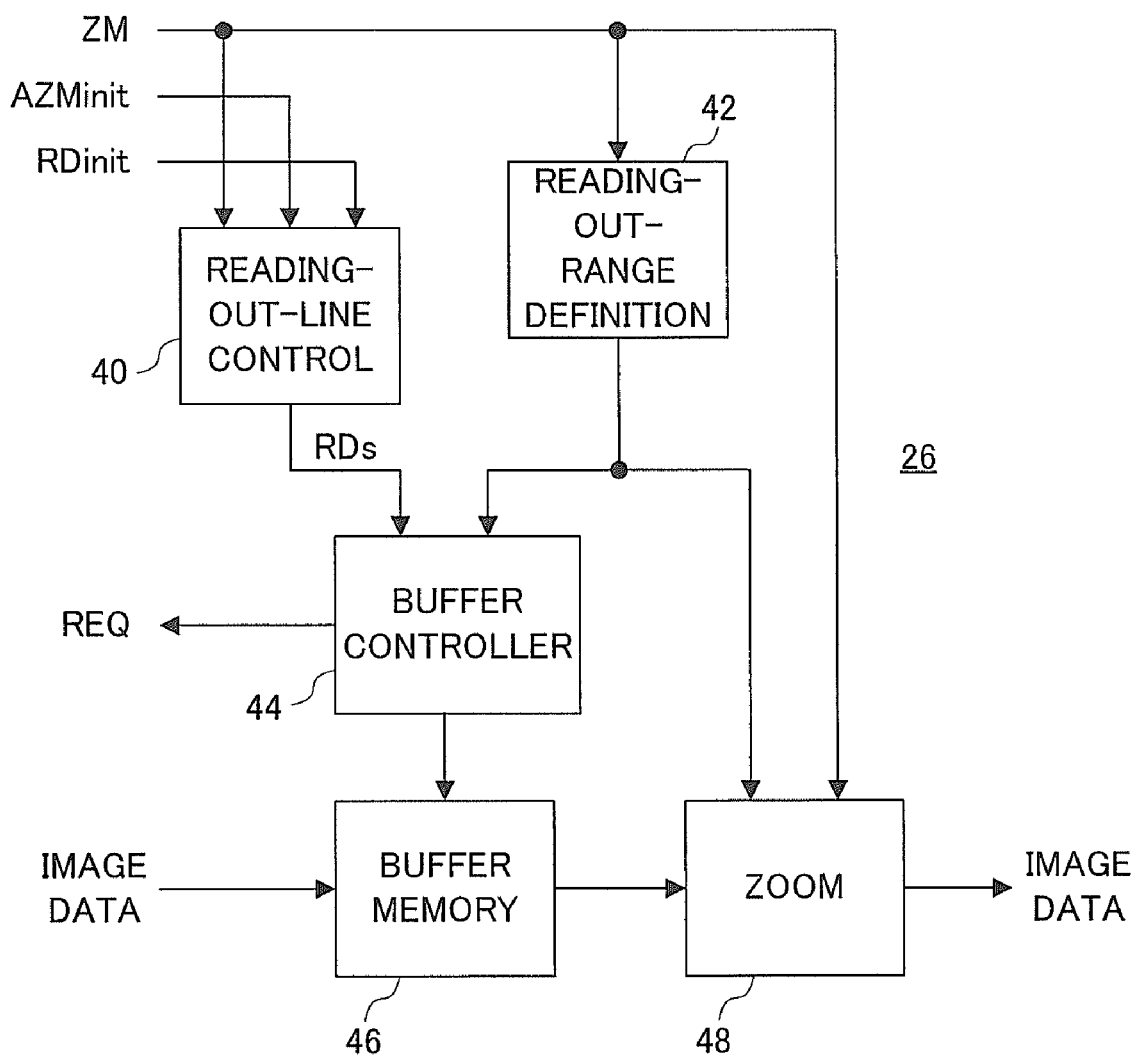
FIG. 5 is a block diagram showing one example of a configuration of an LCD driver applied to the embodiment in FIG. 2.

The LCD driver 26 is configured as shown in FIG. 5. A reading-out-line control circuit 40 repeatedly produces a reading-out line number RDs based on a zoom coefficient ZM, an initial cumulative zoom coefficient AZMinit, and an initial reading-out line number RDinit set by the CPU 34. On the other hand, a reading-out-range defining circuit 42 defines a range of the image data to be read out, based on the zoom coefficient ZM set by the CPU 34.

It is noted that the zoom coefficient ZM, the initial cumulative zoom coefficient AZMinit, and the initial reading-out line number RDinit are updated in response to a zoom manipulation on the key input device 36.

A buffer controller 44 adds, as an offset OFST, a line number at an upper end of the reading-out range defined by the reading-out-range defining circuit 42, to the reading-out line number RDs produced by the reading-out-line control circuit 40. An added value (=RDs+OFST) is described in the reading-out request, and the reading-out request is issued toward the memory control circuit 22. As a result, one portion of the image data belonging to a line designated by the reading-out request is read out from the SDRAM 24.

The image data read out from the SDRAM 24 is applied to a zoom circuit 48 via a buffer memory 46. The zoom circuit 48 executes a zoom process in which the zoom coefficient ZM set by the CPU 34 and the reading-out range defined by the reading-out-range defining circuit 42 are referred to, on the image data applied from the buffer memory 46. The LCD monitor 28 is driven based on the image data on which the zoom process is performed, and thereby, the moving image having a desired zoom magnification is displayed on the monitor screen.

Figure 6:
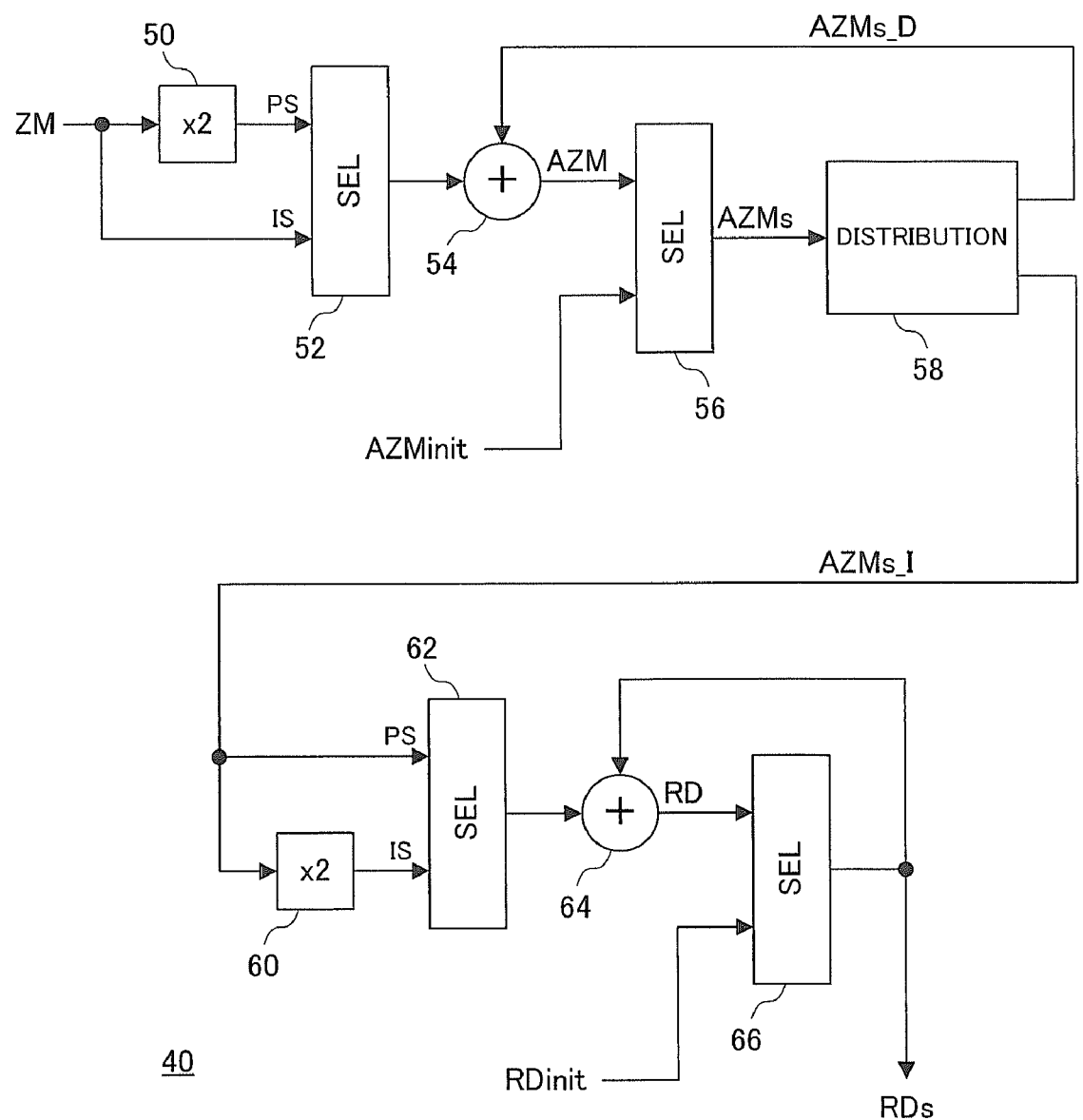
FIG. 6 is a block diagram showing one example of a configuration of a reading-out-line control circuit applied to the embodiment in FIG. 5.

The reading-out-line control circuit 40 is configured as shown in FIG. 6. A multiplier 50 multiples the zoom coefficient ZM by "2". Corresponding to the PS mode, a selector 52 selects an output of the multiplier 50 while corresponding to the IS mode, the selector 52 selects the zoom coefficient ZM. An adder 54 adds a numerical value outputted from the selector 52 to a decimal portion AZMs_D outputted from a distributor 58, and outputs the added value as the cumulative zoom coefficient AZM.

A selector 56 selects the initial cumulative zoom coefficient AZMinit at a timing corresponding to a head line of the reading-out range while selecting the cumulative zoom coefficient AZM outputted from the adder 54 at a timing corresponding to the other line. The selected initial cumulative zoom coefficient AZMinit or cumulative zoom coefficient AZM is applied, as the cumulative zoom coefficient AZMs, to the distributor 58. The distributor 58 divides the cumulative zoom coefficient AZMs into a decimal portion AZMs_D and an integer portion AZMs_I.

A multiplier 60 multiplies the integer portion AZMs_I outputted from the distributor 58 by "2". Corresponding to the PS mode, a selector 62 selects the integer portion AZMs_I outputted from the distributor 58 while corresponding to the IS mode, the selector 62 selects the output of the multiplier 60. An adder 64 adds the output of the selector 62 to the output of a selector 66, and outputs the added value as the reading-out line number RD.

The selector 66 selects the initial reading-out line number RDinit at a timing corresponding to a head line of the reading-out range while selecting the reading-out line number RD outputted from the adder 64 at a timing corresponding to the other line. The selected initial reading-out line number RDinit or reading-out line number RD is outputted, as the reading-out line number RDs, toward the buffer controller 44.

Corresponding to the odd-numbered field, the initial cumulative zoom coefficient AZMinit indicates "0h" while corresponding to the even-numbered field, the coefficient AZMinit indicates a numerical value equivalent to a decimal portion of the zoom coefficient ZM. Moreover, corresponding to the odd-numbered field, the initial reading-out line number RDinit indicates "0h" while corresponding to the even-numbered field, the line number RDinit indicates a numerical value equivalent to an integer portion of the zoom coefficient ZM.

Therefore, when the PS mode is selected and the zoom coefficient ZM indicates "100h", a value obtained by doubling the zoom coefficient ZM (=ZM×2), the cumulative zoom coefficient AZMs, the decimal portion AZMs_D, the integer portion AZMs_I, and the added value (=RDs+OFST) change as shown in FIG. 7(A) corresponding to the odd-numbered field, and change as shown in FIG. 7(B) corresponding to the even-numbered field.

Furthermore, when the IS mode is selected and the zoom coefficient ZM indicates "100h", the zoom coefficient ZM, the cumulative zoom coefficient AZMs, the decimal portion AZMs_D, the integer portion AZMs_I, a value obtained by doubling the integer portion AZMs_I (=AZMs_I×2), and the added value (=RDs+OFST) change as shown in FIG. 8(A) corresponding to the odd-numbered field, and change as shown in FIG. 8(B) corresponding to the even-numbered field.

Furthermore, when the PS mode is selected and the zoom coefficient ZM indicates "140h", the value obtained by doubling the zoom coefficient ZM (=ZM×2), the cumulative zoom coefficient AZMs, the decimal portion AZMs_D, the integer portion AZMs_I, and the added value (=RDs+OFST) change as shown in FIG. 9(A) corresponding to the odd-numbered field, and change as shown in FIG. 9(B) corresponding to the even-numbered field.

Also, when the IS mode is selected and the zoom coefficient ZM indicates "140h", the zoom coefficient ZM, the cumulative zoom coefficient AZMs, the decimal portion AZMs_D, the integer portion AZMs_I, the value obtained by doubling the integer portion AZMs_I (=AZMs_I×2), and the added value (=RDs+OFST) change as shown in FIG. 10(A) corresponding to the odd-numbered field, and change as shown in FIG. 10(B) corresponding to the even-numbered field.

It is noted that the zoom coefficient ZM indicates "100h" when the zoom magnification is "1.0", and indicates "140h" when the zoom magnification is "0.8". Moreover, in FIG. 8(A) to FIG. 8(B), FIG. 9(A) to FIG. 9(B), FIG. 10(A) to FIG. 10(B), and FIG. 11(A) to FIG. 11(B), numerical values surrounded by rectangular frames are equivalent to the initial value.

According to FIG. 10(A) and FIG. 10(B) showing reading-out control behavior when the IS mode is selected, the added value (=RDs+OFST) indicates an odd-numbered line in the odd-numbered field while indicating an even-numbered line in the even-numbered field. It is thereby known that a situation where the image data to be read out strides over a plurality of fields is avoided.

Furthermore, according to FIG. 9(A) and FIG. 9(B) showing reading-out control behavior when the PS mode is selected, the added value (=RDs+OFST) indicates both the odd-numbered line and the even-numbered line both in the odd-numbered field and the even-numbered field. It is thereby known that the optimal line is designated for the zoom process.

Figure 11:
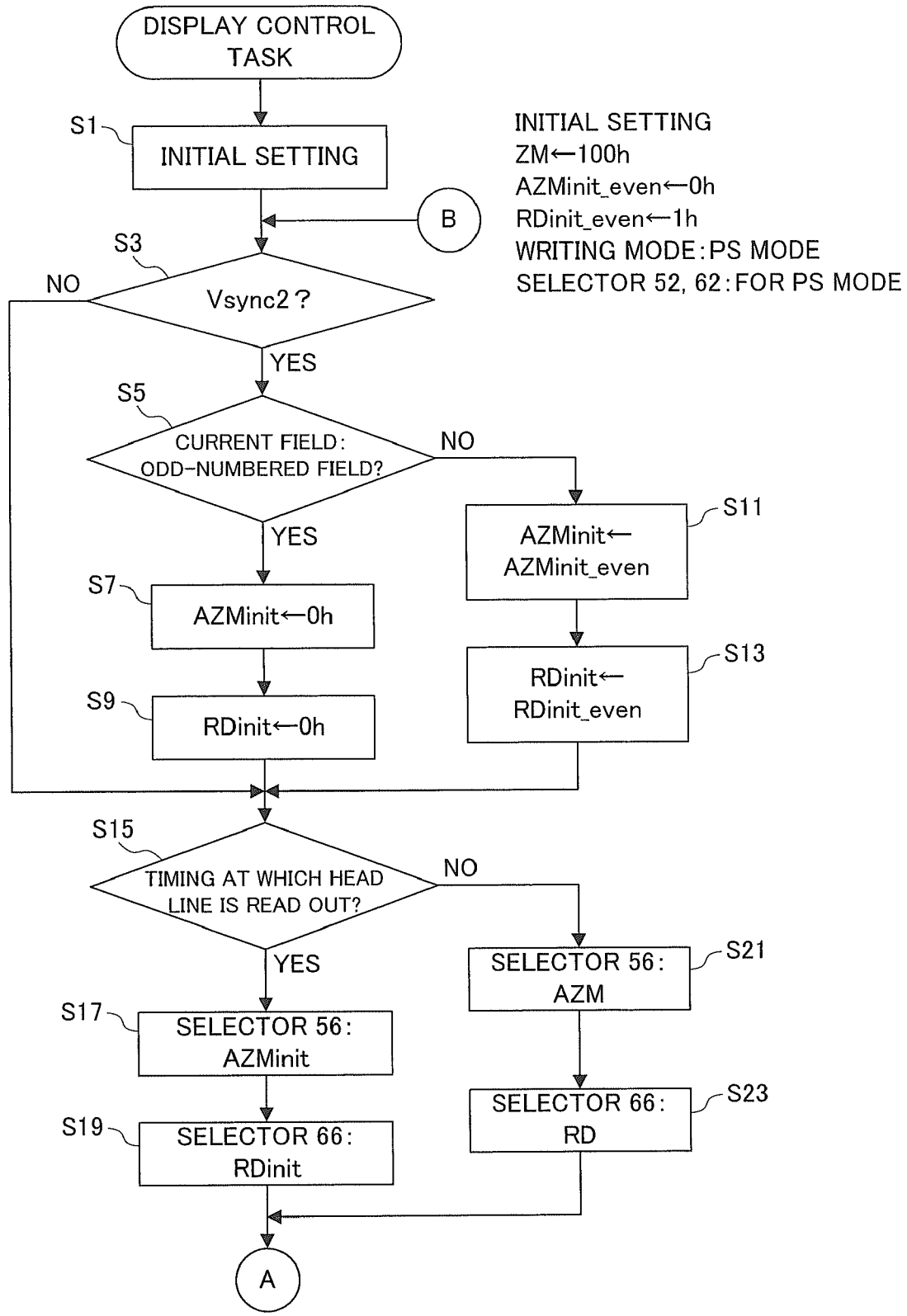
FIG. 11 is a flowchart showing one portion of behavior of a CPU applied to the embodiment in FIG. 2.
Figure 12:
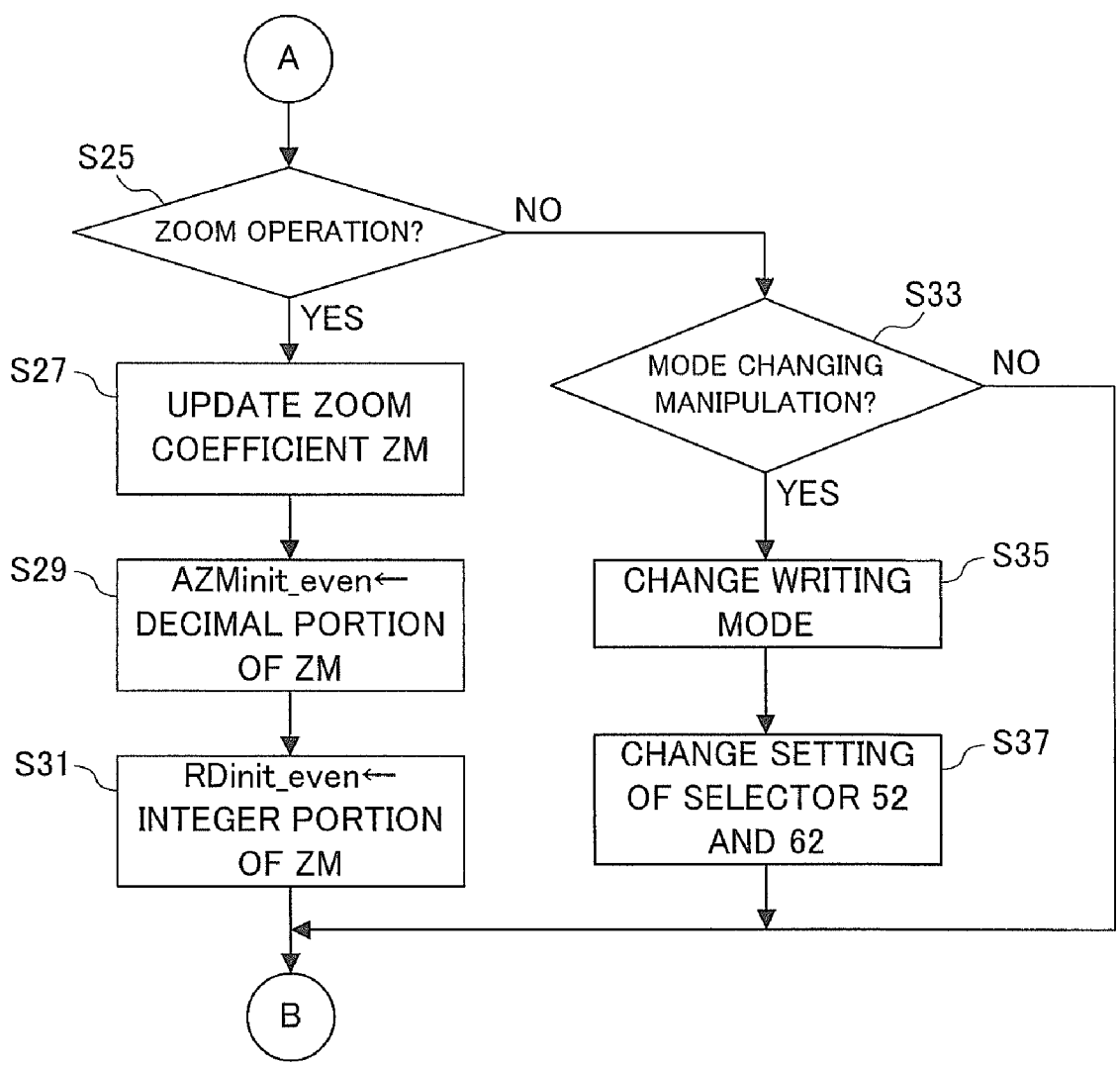
FIG. 12 is a flowchart showing another portion of the behavior of the CPU applied to the embodiment in FIG. 2.

The CPU 34 executes a plurality of tasks, including a display control task shown in FIG. 11 to FIG. 12, in a parallel manner. It is noted that control programs corresponding to these tasks are stored in a flash memory 38.

Firstly, an initial setting process is executed in a step S1. Thereby, the cumulative zoom coefficient ZM is set to "100h", a variable AZMinit_even is set to "0h", and a variable RDinit_even is set to "1h". Moreover, the PS mode is set as a writing mode of the signal processing circuit 20, and selection states of the selectors 52 and 62 are set to be adapted to the PS mode.

In a step S3, it is determined whether or not the vertical synchronization signal Vsync2 for the display system is generated. When a determined result is NO, the process directly advances to a step S15 while when the determined result is YES, the process advances to the step S15 via processes in steps S5 to S13.

In the step S5, it is determined whether the current field is an odd-numbered field or an even-numbered field. When the current field is the odd-numbered field, the processes in the steps S7 to S9 are executed while when the current field is the even-numbered field, the processes in the steps S11 to S13 are executed.

In the step S7, "0h" is set to the initial cumulative zoom coefficient AMZinit, and in the step S9, "0h" is set to the initial reading-out line number RDinit. In the step S11, "AZMinit_even" is set to the initial cumulative zoom coefficient AMZinit, and in the step S13, "RDinit_even" is set to the initial reading-out line number RDinit.

In the step S15, it is determined whether or not the timing at which the head line is read out arrives. When a determined result is YES, processes in steps S17 to S19 are executed while when the determined result is NO, processes in steps S21 to S23 are executed.

In the step S17, the selector 56 is requested to select the initial cumulative zoom coefficient AZMinit, and in the step S19, the selector 66 is requested to select the initial reading-out line number RDinit. In the step S21, the selector 56 is requested to select the cumulative zoom coefficient AZM outputted from the adder 54, and in the step S23, the selector 66 is requested to select the reading-out line number RD outputted from the adder 64.

Upon completion of the process in the step S19 or S23, it is determined in a step S25 whether or not the zoom manipulation is performed, and it is determined in a step S33 whether or not a mode changing manipulation is performed. When YES is determined in the step S25, the process returns to the step S3 via the processes in steps S27 to S31, when YES is determined in the step S33, the process returns to the step S3 via the processes in steps S35 to S37, and when NO is determined both in the steps S25 and S33, the process directly returns to the step S3.

In the step S27, the zoom coefficient ZM is updated. In the step S29, the decimal portion of the updated zoom coefficient ZM is set to the variable AZMinit_even. In the step S31, the integer portion of the updated zoom coefficient ZM is set to the variable RDinit_even. In the step S35, the writing mode of the signal processing circuit 20 is changed to a designation mode. In the step S37, the settings of the selectors 52 and 62 are changed so as to be adapted to the designation mode.

As can be seen from the above-described explanation, the data writing circuit 22w writes the image data having one of the manners of the non-interlaced scanning and the interlaced scanning, into the SDRAM 24. The adder 54 accumulates "AZMs_D", which is the decimal portion of the cumulative zoom coefficient AZMs, for each line, to the first numerical value corresponding to the zoom coefficient ZM, and updates the cumulative zoom coefficient AZMs. The adder 64 accumulates, for each line, the second numerical value corresponding to "AZMs_I" that is the integer portion of the cumulative zoom coefficient AZMs. Out of the image data accommodated in the SDRAM 24, the data reading-out circuit 22r reads out the data in the line corresponding to the accumulated value calculated by the adder 64. Corresponding to the non-interlaced scanning, the selector 52 selects, as the first numerical value, the numerical value obtained by doubling the zoom coefficient ZM, and corresponding to the interlaced scanning, the selector 52 selects, as the first numerical value, the zoom coefficient ZM. Corresponding to the non-interlaced scanning, the selector 62 selects, as the second numerical value, the integer portion AZMs_I, and corresponding to the interlaced scanning, the selector 62 selects, as the second numerical value, the numerical value obtained by doubling the integer portion ATMs_I.

An arithmetic operation for "doubling" is executed both in the non-interlaced scanning and the interlaced scanning, and it is therefore possible to share the expansion of the zoomed image between the scanning manners. Moreover, when the numerical value obtained by doubling the integer portion AZMs_I is selected as the second numerical value corresponding to the interlaced scanning, it is possible to avoid a situation where the image data read out from the SDRAM 24 strides over a plurality of fields. Furthermore, when the numerical value obtained by doubling the zoom coefficient ZM is selected as the first numerical value corresponding to the non-interlaced scanning, the accuracy of the cumulative zoom coefficient AZMs is secured. Thus, the quality of the image data on which the zoom process is performed is improved.

It is noted that in this embodiment, as the memory in which the image data is accommodated, the SDRAM is adopted; however, instead of the SDRAM, other memories such as an MRAM (Magnetoresistive Random Access Memory) may be optionally adopted. Moreover, in this embodiment, the present invention is described by using a digital camera; however, the present invention can also be applied to other image-data processing apparatuses such as a stationary video decoder.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image-data processing apparatus, comprising:
   a writer which writes image data into a memory in a manner according to one of a non-interlaced scanning and an interlaced scanning of each N line (N: an integer of two or more);
   an updater which updates a cumulative zoom coefficient by accumulating, for each line, a decimal portion of the cumulative zoom coefficient to a first numerical value corresponding to the zoom coefficient;
   an accumulator which accumulates, for each line, a second numerical value corresponding to an integer portion of the cumulative zoom coefficient;
   a reader which reads out data in a line corresponding to an accumulated value of said accumulator, out of the image data accommodated in the memory by the writer;
   a first setter which sets N times of the zoom coefficient to the first numerical value, corresponding to the non-interlaced scanning, and which sets the zoom coefficient to the first numerical value, corresponding to the interlaced scanning; and
   a second setter which sets the integer portion to the second numerical value, corresponding to the non-interlaced scanning, and sets N times of the integer portion to the second numerical value, corresponding to the interlaced scanning.

2. An image-data processing apparatus according to claim 1, further comprising a zoom processor which performs a zoom process in which the zoom coefficient is referred to on the image data read out by said reader.

3. An image-data processing apparatus according to claim 1, wherein said writer executes a writing process at a rate of one frame in a first period, corresponding to the non-interlaced scanning and executes a writing process at a rate of one frame in a period that is N times the first period, corresponding to the interlaced scanning; and said reader executes a reading-out process at a rate of one frame in a period that is N times the first period.

4. An image-data processing apparatus according to claim 3, wherein said updater includes a first initializer which initializes the cumulative zoom coefficient at each elapse of the first period, and said accumulator includes a second initializer which initializes the accumulated value at each elapse of the first period.

5. An image-data processing apparatus according to claim 4, further comprising:
- a first initial-value changer which changes, among N numerical values, an initial value of the cumulative zoom coefficient at each elapse of the first period; and
- a second initial-value changer which changes, among N numerical values, an initial value of the accumulated value at each elapse of the first period.

6. An image-data processing apparatus according to claim 1, further comprising a coefficient updater which updates the zoom coefficient in response to a zoom manipulation.

7. An image-data processing apparatus according to claim 1, further comprising a scanning-manner changer which changes a scanning manner of the image data written by said writer between the non-interlaced scanning and the interlaced scanning in response to a manner changing manipulation.

* * * * *